(12) United States Patent
Kondratiuk et al.

(10) Patent No.: US 12,404,932 B2
(45) Date of Patent: Sep. 2, 2025

(54) SEALING GEOMETRY FOR A MOBILE POWER TOOL

(71) Applicant: Hilti Aktiengesellschaft, Schaan (LI)

(72) Inventors: Jens Kondratiuk, Buchs (CH); Daniel Hummel, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/032,074

(22) PCT Filed: Oct. 14, 2021

(86) PCT No.: PCT/EP2021/078455
§ 371 (c)(1),
(2) Date: Apr. 14, 2023

(87) PCT Pub. No.: WO2022/089945
PCT Pub. Date: May 5, 2022

(65) Prior Publication Data
US 2023/0407970 A1 Dec. 21, 2023

(30) Foreign Application Priority Data
Oct. 28, 2020 (EP) ..................... 20204286

(51) Int. Cl.
*F16J 15/3204* (2016.01)
*B25D 16/00* (2006.01)
(Continued)

(52) U.S. Cl.
CPC .......... *F16J 15/3204* (2013.01); *B25D 17/26* (2013.01); *F16J 15/40* (2013.01); *F16J 15/447* (2013.01);
(Continued)

(58) Field of Classification Search
CPC ........ F16J 15/3204; F16J 15/40; F16J 15/447; F16J 15/441; F16J 15/3272; B25D 16/00; B25D 17/26; B25D 2250/365
(Continued)

(56) References Cited

U.S. PATENT DOCUMENTS 2,478,649 A * 8/1949 Wightman ............... F16J 15/42
277/377
3,266,811 A * 8/1966 Knauth ................. F16J 15/164
277/433
(Continued)

FOREIGN PATENT DOCUMENTS

DE 3330473 A1 5/1984
DE 3438755 A1 4/1986
(Continued)

OTHER PUBLICATIONS

European Patent Office, International Search Report and Written Opinion in International Patent Application No. PCT/EP2021/078455, mailed on Jan. 24, 2022.
(Continued)

*Primary Examiner* — Dariush Seif
(74) *Attorney, Agent, or Firm* — Leydig, Voit & Mayer, Ltd.

(57) ABSTRACT

A sealing geometry for a mobile power tool is provided wherein the mobile power tool has a drive unit, wherein the sealing geometry is designed to seal off an interior (IB), containing a lubricant, of the drive unit from an exterior (AB) outside the drive unit. The sealing geometry has a seal that is contactless at least during operation of the drive unit.

20 Claims, 2 Drawing Sheets

Figure 1:
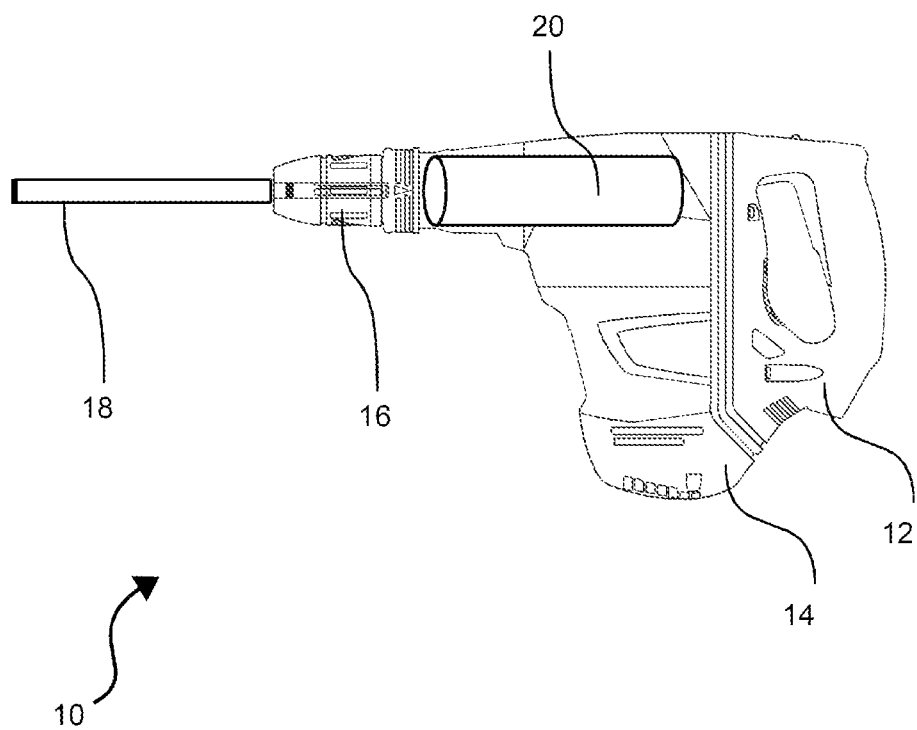

(51) Int. Cl.
*B25D 17/26* (2006.01)
*F16J 15/40* (2006.01)
*F16J 15/447* (2006.01)

(52) U.S. Cl.
CPC ........ *B25D 16/00* (2013.01); *B25D 2250/365* (2013.01)

(58) Field of Classification Search
USPC .......................................................... 173/197
See application file for complete search history.

(56) References Cited

U.S. PATENT DOCUMENTS

| | | | | |
|---|---|---|---|---|
| 4,448,426 A * | 5/1984 | Jackowski | ........... | F16J 15/3256 277/568 |
| 4,709,930 A * | 12/1987 | Forch | ................... | F16J 15/3244 277/430 |
| 4,852,890 A * | 8/1989 | Borowski | ............... | F16J 15/164 277/377 |
| 4,928,979 A * | 5/1990 | Nagasawa | ........... | F16J 15/3264 277/424 |
| 4,968,044 A * | 11/1990 | Petrak | ................... | F16J 15/3456 384/140 |
| 4,974,860 A * | 12/1990 | Anzue | .................... | F16J 15/164 277/377 |
| 5,201,529 A * | 4/1993 | Heinzen | ............... | F16J 15/3256 277/411 |
| 5,350,181 A * | 9/1994 | Horve | .................... | F16J 15/3244 277/560 |
| 6,170,832 B1 * | 1/2001 | Ernst | ..................... | F16C 33/763 277/412 |
| 6,170,834 B1 * | 1/2001 | Vogt | ..................... | F16J 15/3256 277/571 |
| 6,354,598 B1 * | 3/2002 | Huang | ................. | F16J 15/3244 277/572 |
| 6,367,807 B1 * | 4/2002 | Rockwood | ........... | F16J 15/4478 277/412 |
| 6,474,653 B1 * | 11/2002 | Hintenlang | .......... | F16J 15/3256 277/572 |
| 7,066,467 B2 * | 6/2006 | Sakata | .................... | F16C 19/49 277/423 |
| 7,464,942 B2 * | 12/2008 | Madigan | .............. | F16J 15/3252 277/569 |
| 7,926,815 B2 * | 4/2011 | Niebling | ............... | F16J 15/3264 277/571 |
| 8,186,689 B2 * | 5/2012 | Miyazawa | ................ | B25F 5/02 277/423 |
| 8,246,253 B2 * | 8/2012 | Masui | ................... | F16J 15/3456 384/477 |
| 8,276,917 B2 * | 10/2012 | Nakagawa | ............. | F16J 15/324 277/423 |
| 8,356,941 B2 * | 1/2013 | Mason | .................... | F16C 33/80 384/477 |
| 8,474,825 B2 * | 7/2013 | Nakagawa | ............. | F16J 15/164 277/572 |
| 8,534,674 B2 * | 9/2013 | Maskaliunas | ........ | F16J 15/3208 277/551 |
| 8,809,243 B2 | 8/2014 | Schmid-Amelunxen et al. | | |
| 9,039,013 B2 | 5/2015 | Artiles et al. | | |
| 9,568,105 B2 * | 2/2017 | Oshima | ................ | F16J 15/3244 |
| 9,618,117 B2 * | 4/2017 | Nakagawa | ............. | F16J 5/3256 |
| 10,054,229 B2 * | 8/2018 | Organisciak | ........ | F16C 33/7889 |
| 10,288,175 B2 * | 5/2019 | Schmitt | ................ | F16J 15/3256 |
| 10,955,006 B2 * | 3/2021 | Laplante | ............. | F16J 15/3264 |
| 11,085,004 B2 | 8/2021 | Seemeyer et al. | | |
| 2003/0006563 A1 * | 1/2003 | Cater | ................... | F16J 15/3456 277/549 |
| 2003/0184021 A1 * | 10/2003 | Hatch | .................. | F16J 15/3228 277/395 |
| 2004/0070150 A1 * | 4/2004 | Chitren | ................ | F16J 15/4474 277/358 |
| 2004/0113366 A1 * | 6/2004 | Mause | ................ | F16C 33/7859 277/394 |
| 2007/0080503 A1 * | 4/2007 | Soda | ..................... | F16J 15/3256 277/551 |
| 2008/0122182 A1 * | 5/2008 | Parker | .................. | F16J 15/3488 29/402.02 |
| 2009/0001671 A1 * | 1/2009 | Dietle | .................... | F16J 15/164 277/559 |
| 2010/0102515 A1 | 4/2010 | Miyazawa et al. | | |
| 2010/0194054 A1 * | 8/2010 | Nishigaki | ............ | F16J 15/3288 277/549 |
| 2012/0007316 A1 * | 1/2012 | Terasawa | ............ | F16C 33/7886 277/361 |
| 2012/0149616 A1 | 6/2012 | Schmid-Amelunxen et al. | | |
| 2012/0280458 A1 | 11/2012 | Artiles et al. | | |
| 2012/0305279 A1 | 12/2012 | Schadow et al. | | |
| 2013/0035267 A1 | 2/2013 | Schweigkofler et al. | | |
| 2015/0211639 A1 * | 7/2015 | Grimanis | ............... | F16J 15/447 277/303 |
| 2016/0108966 A1 | 4/2016 | Krebs et al. | | |
| 2016/0153561 A1 * | 6/2016 | Blechschmidt | ...... | F16J 15/3232 277/553 |
| 2017/0268679 A1 * | 9/2017 | Itadani | ................ | F16J 15/3412 |
| 2017/0284533 A1 * | 10/2017 | Biermann | ........... | F16J 15/3204 |
| 2018/0106374 A1 * | 4/2018 | Itadani | ................. | F16J 15/3448 |
| 2018/0347702 A1 * | 12/2018 | Sakano | .................. | F16J 15/164 |
| 2020/0080647 A1 * | 3/2020 | Specht | ................... | F16J 15/164 |
| 2020/0157454 A1 | 5/2020 | Seemeyer et al. | | |
| 2020/0166138 A1 * | 5/2020 | Yonai | .................... | F16J 15/3264 |
| 2021/0148466 A1 * | 5/2021 | Von Fragstein | ......... | C08J 7/123 |
| 2023/0407970 A1 * | 12/2023 | Kondratiuk | ............ | F16J 15/447 |

FOREIGN PATENT DOCUMENTS

| | | |
|---|---|---|
| DE | 3734888 A1 | 4/1989 |
| DE | 199 34 170 A1 | 1/2001 |
| DE | 199 59 472 A1 | 6/2001 |
| DE | 102 06 823 A1 | 8/2003 |
| DE | 199 50 705 B4 | 10/2009 |
| DE | 10 2008 029 994 A1 | 1/2010 |
| DE | 10 2013 200 117 A1 | 7/2014 |
| DE | 10 2013 208 203 A1 | 11/2014 |
| DE | 10 2014 214 049 A1 | 1/2016 |
| DE | 10 2016 208 258 B4 | 12/2017 |
| EP | 1 0550 700 B1 | 6/2005 |
| EP | 2 180 214 A1 | 4/2010 |
| EP | 2 520 835 B1 | 8/2014 |
| WO | 2011/026576 A1 | 3/2011 |
| WO | WO 2011/082880 A1 | 7/2011 |
| WO | 2011/131331 A1 | 10/2011 |
| WO | WO 2013/060464 A1 | 5/2013 |
| WO | 2015/144342 A1 | 10/2015 |
| WO | 2016/131543 A1 | 8/2016 |
| WO | 2018/206252 A1 | 11/2018 |

OTHER PUBLICATIONS

Hasslinger, "Hydro Lubricants: Are water-containing lubricants the future?", URL: https://www.fluid.de/hydraulik/hydro-lubricants-ist-wasser-im-schmirstoff-die-zukunft-208.html, published Oct. 15, 2017, accessed Mar. 17, 2021.

* cited by examiner

SEALING GEOMETRY FOR A MOBILE POWER TOOL

CROSS-REFERENCE TO RELATED APPLICATIONS

This patent application is the U.S. National Stage of International Patent Application No. PCT/EP2021/078455, filed Oct. 14, 2021, which claims the benefit of European Patent Application No. 20204286.7, filed Oct. 28, 2020, which are each incorporated by reference.

The present invention relates to a sealing geometry for a mobile power tool, for example a hand-held power tool, in particular for working on natural or artificial, in particular cementitious, rocks, wherein the mobile power tool has a drive unit, wherein the sealing geometry is designed to seal off an interior, containing a lubricant, of the drive unit from an exterior outside the drive unit. The invention also relates to a mobile power tool.

Parts, moving relative to one another, of mobile power tools, in particular of hand-held power tools, and in particular moving parts of the drive unit, are frequently subject to significant friction. The friction causes considerable losses of work output of the hand-held power tool. Substantial temperature increases can also occur locally or over the entire hand-held power tool. These in turn frequently cause accelerated wear. These temperature increases also represent a safety hazard for a user of the hand-held power tool. To reduce this friction, there is usually a lubricant in the drive unit. A sealing geometry then serves to seal off the interior, comprising lubricant, from the exterior. In particular in the case of powerful hand-held power tools, the sealing geometry is subject to significant mechanical and thermal stress. This is associated with high maintenance costs and relatively short service lives.

Therefore, it is desirable, and thus an object of the present invention, to present a generic sealing geometry and a mobile power tool which have particularly long service lives.

Surprisingly, the object is achieved by a sealing geometry for a mobile power tool, in particular for working on natural or artificial, in particular cementitious, rocks, wherein the mobile power tool has a drive unit, wherein the sealing geometry is designed to seal off an interior, containing a lubricant, of the drive unit from an exterior outside the drive unit, wherein the sealing geometry has a seal that is contactless at least during operation of the drive unit.

The mobile power tool can be or comprise a hand-held power tool. The mobile power tool can also be or comprise a construction robot, in particular designed for working in civil engineering above and/or below ground.

A seal that is contactless at least during operation of the drive unit can be understood as being a seal that is designed to provide a seal between two elements that are spaced apart, as a rule slightly, from one another, wherein the seal is spaced apart from at least one of the two elements at least during operation of the drive unit. It can thus be configured not to be in contact with this element at least during operation of the drive unit.

The invention is based on the idea that a contactless seal during operation of the drive unit is subject to no or at least no appreciable friction. Mechanical and associated thermal stresses on the sealing geometry can thus be reduced. As a result, the service life of the sealing geometry can be considerably increased. The maintenance costs required for the sealing geometry can also be considerably reduced or even avoided entirely. Temperatures at and/or in a mobile power tool in which the sealing geometry is used can also be reduced. Lubricant cooling devices can have smaller dimensions or be dispensed with entirely. The work output and/or, for example in battery-operated devices, the operating life of the mobile power tool can also be increased or lengthened on account of the reduced friction.

The sealing geometry can particularly preferably be designed to be used with an aqueous lubricant. To this end, it can be adapted in particular to properties and demands that arise on account of the high water content, for example be configured to be water- and/or water-vapor-resistant.

The aqueous lubricant can comprise at least 5 percent, preferably at least 15 percent, water. In particularly preferred embodiments of the invention, the lubricant has a water content of between 25 and 40 percent, in particular of 28 or of 38 percent. Water can form the main constituent of the lubricant. The aqueous lubricant can be fluid, in particular liquid, at a normal operating temperature of the mobile power tool. The water content of the lubricant may be at most 70 percent. The lubricant may comprise, in addition to water, at least one additive, in particular an antiwear additive, an anticorrosion additive and/or an antimicrobial, growth-inhibiting additive. The lubricant may also comprise at least one glycol. The glycol or glycols can, in particular after water, make up a second largest share of the lubricant.

The indication of a percentage can preferably be understood to be a weight-related percentage, that is to say a percentage by weight.

The sealing geometry can have a sealing lip that bears against a mating surface of the mobile power tool, in particular of the drive unit, when the drive unit is at a standstill, in order to seal off the interior from the exterior. In this way, a durable seal can be ensured when the drive unit is at a standstill.

The or a sealing lip of the sealing geometry may be configured such that, during operation of the drive unit, this sealing lip comes away from the or a mating surface or that, during operation of the drive unit, a pressure force of this sealing lip on this mating surface is reduced at least compared with when the drive unit is at a standstill. The sealing geometry may be designed such that the coming away or the reduction in the pressure force arises only from a predefined, in particular lower, limit value, for example a minimum rotational speed of a shaft of the mobile power tool. The sealing geometry can in particular be designed such that the coming away or the reduction in the pressure force arises as a result of a centripetal force brought about by the operation of the drive unit.

The sealing geometry may have a seal carrier on and/or in which the sealing lip is arranged, wherein preferably the sealing lip fits in an indentation in the seal carrier. The sealing lip can then be made from a different material than the seal carrier. For example, the sealing lip can be made from a thermoplastic. The seal carrier can be made from an elastomer. It is also conceivable for the sealing lip to be made from an elastomer. The seal carrier can also be made from a thermoplastic.

The sealing lip may have a V-shaped or an at least substantially V-shaped cross section. It may in particular have a sealing lip wing. The sealing lip wing may form an arm of the V-shaped or substantially V-shaped cross section. As a result of the V-shape, the sealing lip, in particular when it is made from an elastic material, can have a low spring constant.

The sealing geometry may be designed to create at least one vortex flow in the lubricant during operation of the drive unit, said vortex flow improving the sealing action of the sealing geometry. In particular, the vortex flow can create a suction effect such that only a reduced amount of lubricant can even reach the sealing lip. As a result of the vortex flow, an additional sealing action can be achieved, in particular through a further increase in the flow resistance in the exit direction. For example, when the sealing geometry comprises a region of two cylindrical or at least substantially cylindrical parts, in the case of which preferably one of the parts is arranged in the other part, such vortex flows can be generated for example by Taylor-Couette flows.

To this end, the seal carrier of the sealing geometry can alternatively or additionally have at least one vortex structure for creating the at least one vortex flow. The vortex structure can be formed on a surface portion of the seal carrier. It can be configured in the form of an elliptic arc, in particular of a circular arc, in cross section.

It is also conceivable for the sealing geometry to be designed to have and/or to create a sealing fluid, in particular sealing air, at least during operation of the drive unit. The sealing fluid, in particular the sealing air, can to this end form an air cushion blocking the lubricant.

The sealing geometry can also be configured in a ferromagnetically sealing manner.

The sealing geometry may have a lubricant labyrinth seal. This can be formed upstream of the sealing lip along a flow path of the lubricant. The sealing geometry may have a constriction. The constriction may be elongate. The sealing geometry may have at least one flow obstacle. In general, the sealing geometry can be configured to increase a flow resistance of the lubricant in an exit direction from the interior to the exterior. It can have for example a Tesla valve or at least a Tesla-valve-like structure. It can in particular be configured such that, at least during operation of the drive unit, the lubricant builds up a counterpressure to further lubricant flowing up in the exit direction.

It is also conceivable for at least one thread to be formed in the region of the lubricant labyrinth seal, in particular in the region of the constriction. By way of the thread, lubricant can additionally be conveyed away from the sealing lip during operation of the drive unit. To this end, the thread can preferably be formed so as to extend in a radial direction or at least so as not to extend axially with respect to the shaft.

In a particularly cost-effective embodiment of the mobile power tool, the sealing geometry may comprise an acrylonitrile butadiene (in the following: NBR). The NBR may be a hydrated NBR or an NBR modified in some other way. Thus, the sealing geometry can be resistant to water, hot water and/or water vapor.

The sealing geometry may also comprise a fluorine-containing material. In particular, it may comprise a fluorine-containing rubber. The sealing geometry may be made from a particularly temperature-resistant elastomer. The fluorine-containing rubber may particularly preferably be a fluororubber (in the following: FKM). Alternatively or additionally, it is also conceivable for the fluorine-containing rubber to be or to comprise a perfluororubber (FFKM). In general, the fluorine-containing rubber may be a fluorinated elastomer. It is also conceivable for the fluorine-containing material to be a polytetrafluoroethylene (PTFE). The sealing geometry may also comprise different fluorine-containing materials, in particular different fluorine-containing rubbers and/or a PTFE.

The sealing geometry is usable in a particularly flexible manner, in particular also usable in conjunction with an aqueous lubricant, when the sealing geometry comprises a water-vapor-resistant material. Preferably, the sealing geometry can be made from at least one water-vapor-resistant material.

The categorization of a material as water-vapor-resistant, hot-water-resistant and/or water-vapor resistant can be based on an examination pursuant to ISO 1817. Preferably, the categorization may relate to testing at 60° C. and/or, in particular for testing the water-vapor resistance, at 100° C. The duration of the testing taken as a basis can be at least 72 hours, particularly preferably 168 hours and/or 1008 hours. Testing twice over 168 hours and over 1008 hours is very particularly preferred. A change in tensile strength and/or elongation at break can be used as a categorization feature. In particular, upon testing over 168 hours at 60° C., a particularly suitable material can exhibit a reduction in tensile strength of at most 14%, particularly preferably of at most 10% and very particularly preferably of at most 8%.

The possible uses of the sealing geometry according to the invention can also be expanded when the sealing geometry comprises a high-temperature-resistant material. Preferably, the sealing geometry may be made from a high-temperature-resistant material. In particular, the sealing geometry may comprise a material that is sustainably resistant to temperatures of at least 120° C., particularly preferably of at least 150° C. The sealing geometry may in particular be made from a material that is resistant to water vapor at temperatures of at least 120° C., particularly preferably of at least 150° C. In particular, it is conceivable for the sealing geometry to comprise a fluorine-containing rubber that is water-vapor-resistant and high-temperature-resistant in such a way.

Alternatively or additionally, the maintenance costs can be reduced further and/or the service life of the sealing geometry can be increased when the sealing geometry, in particular the sealing lip, has a coating. The coating may be a plasma coating. It may be glass-like or diamond-like. In general, it may have a Mohs hardness greater than the rest of the material of the sealing geometry.

The sealing geometry may be in the form of a multistage seal. To this end, it may have at least two sealing lips.

Wear, in particular on the sealing geometry, can also be reduced in that the sealing geometry is configured to apply a pressure force that is as low as possible. If the sealing geometry has, for example, a radial shaft shaft sealing ring, the radial shaft shaft sealing ring may be designed to generate only a relatively low radial pressure force. The radial pressure force generated can be quantified by a circumferential radial pressure force. Preferably, the circumferential radial pressure force may be at most 200 N/m, particularly preferably at most 160 N/m. As a result of such a low radial pressure force, a friction-related increase in temperature in the sealing geometry is reduced or avoided. In spite of the relatively high water content of the lubricant, a formation of water vapor in the region of the sealing geometry can be avoided or at least reduced as a result. The material of the sealing geometry can thus be exposed to relatively little stress. This advantage can be particularly meaningful when the sealing geometry comprises a fluorine-containing rubber, in particular an FKM.

To reduce or avoid the ingress of contaminants into the drive unit, a contaminant labyrinth seal may be arranged on or in the drive unit. Preferably, the contaminant labyrinth seal may be arranged in the exterior and/or adjoin the exterior.

The scope of the invention also includes a mobile power tool, for example a hand-held power tool, in particular for working on natural or artificial, in particular cementitious, rocks, wherein the mobile power tool has a drive unit and a sealing geometry, wherein the sealing geometry is designed to seal off an interior, containing a lubricant, of the drive unit from an exterior outside the drive unit, wherein the mobile power tool, in particular the drive unit, has a sealing geometry according to the invention.

The mobile power tool in which the sealing geometry is used can be configured as an electric hand-held power tool. It can also be designed as a construction robot, in particular designed for working in civil engineering above and/or below ground.

It can be configured and/or usable as a drill, chiseling machine, hammer drill, as a direct setting device or the like. The mobile power tool can be a high-performance device, in particular with a consumed power of at least 1 kW, particularly preferably of at least 2 kW. In particular, the mobile power tool can be intended to be operated at powers that lie in the region of a maximum power able to be drawn from a power source, in particular a power grid or a power storage unit.

As a result of the reduction in friction that is achieved, a notable increase in the work output of the mobile power tool can thus be achieved, compared with previous mobile power tools of the same performance class, in particular in the region of the maximum power able to be drawn from the power source.

The drive unit may have at least one transmission. The lubricant may be designed to lubricate at least a part of the drive unit, in particular the transmission or at least a part of the transmission.

Particularly preferably, the mobile power tool can be cordless. In cordless mobile power tools, the total energy that is available is usually limited. The work outputs of cordless mobile power tools are also often reduced compared with corded tools. As a result of the reduction in friction achieved according to the invention, operating lives can be lengthened. It is also possible for the previously reduced work outputs to be increased and raised for example to the level of corded tools, wherein, at the same time, the flexible use of cordless mobile power tools can be maintained.

To this end, the mobile power tool can have a rechargeable power storage unit. For example, it can have a battery, in particular a lithium-based battery. Alternatively or additionally, it is also conceivable for the mobile power tool to have a fuel cell.

The mobile power tool can preferably be designed to drive a diamond-containing tool. The diamond-containing tool can be for example a diamond drill bit, a diamond saw blade or the like.

The sealing geometry can be configured to seal off a boundary region between a housing of the mobile power tool and a shaft driven by the drive unit, for example a shaft of a tool fitting of the mobile power tool.

Alternatively or additionally, the maintenance costs of the mobile power tool, in particular the sealing geometry thereof, can be reduced and/or its service life extended further when the mobile power tool is configured such that the temperature of the sealing geometry remains below 120° C., preferably below 100° C., during operation of the drive unit. To this end, the mobile power tool can have a cooling device. If the sealing geometry has or is configured as a dynamic seal, meaning that it is designed to provide sealing at a part that moves relative thereto, for example at the shaft, the sealing geometry can adjoin, in particular only, at least one part that moves relatively slowly relative thereto. A rotational speed of the at least one part that moves relative to the sealing geometry can be less than $10^4$ revolutions per minute, in particular less than $8 \times 10^3$ revolutions per minute. The rotational speed can be at most two fifths, preferably at most one third, of the rotational speed of a previously conventional generic mobile power tool, for example of a mobile power tool having $22 \times 10^3$ revolutions per minute. To this end, it is conceivable for example to enclose the drive unit in a housing. Only a shaft, for example for driving a tool fitting of the mobile power tool, can emerge from the housing. Such a shaft is usually located on an output side of the drive unit and therefore usually exhibits relatively low speeds.

The lubricant can be an aqueous lubricant. It can have the features described above in connection with the sealing geometry.

The scope of the invention also includes the use of a mobile power tool according to the invention for working on a natural or artificial rock, preferably for demolishing and/or erecting a building. In the case of such a use of the mobile power tool according to the invention, particularly high work outputs are frequently necessary, and so the value of the invention can be particularly pronounced in the case of this use.

Further features and advantages of the invention emerge from the following detailed description of exemplary embodiments of the invention, with reference to the figures of the drawing, which shows details essential to the invention, and from the claims. The features shown there are not necessarily to be understood as true to scale and are shown in such a way that the special features according to the invention can be made clearly visible. The various features can be implemented individually in their own right or collectively in any combination in variants of the invention.

In the schematic drawing, exemplary embodiments of the invention are shown and explained in more detail in the following description.

BRIEF DESCRIPTION OF THE SEVERAL VIEWS OF THE DRAWING(S)

Figure 2:
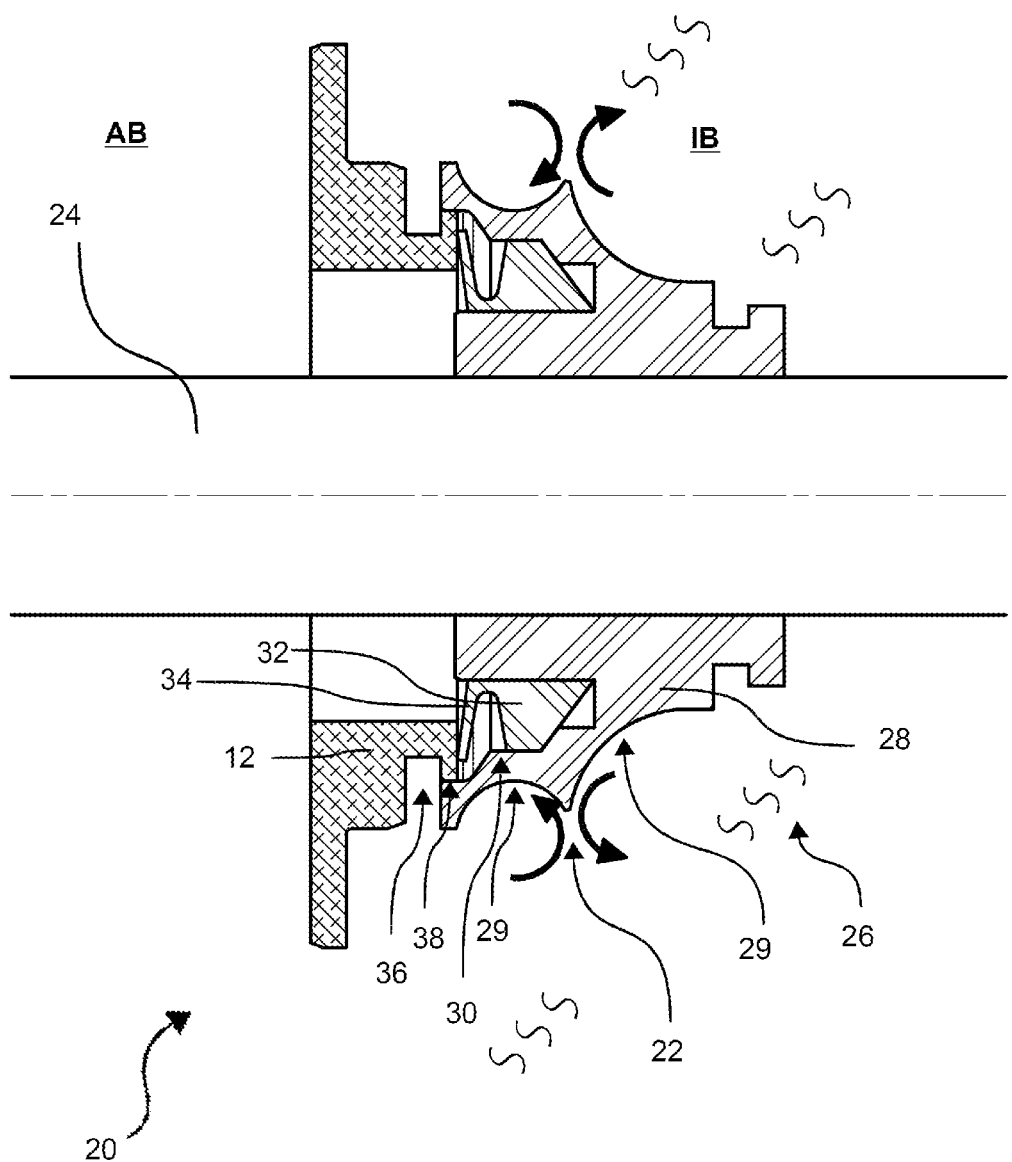

In the figures:
FIG. 1 shows a hand-held power tool;
FIG. 2 shows a schematic illustration of a detail of a drive unit of the hand-held power tool having a sealing geometry and having lubricant.

DETAILED DESCRIPTION OF THE INVENTION

In order to make it easier to understand the invention, the same reference signs are used in each case for identical or functionally corresponding elements in the following description of the figures.

Although the invention generally encompasses mobile power tools and therefore for example construction robots or hand-held power tools, the invention is explained using the example of a hand-held power tool, only to make it easier to understand.

FIG. 1 shows a hand-held power tool 10. The hand-held power tool 10 is configured as a hammer drill. It is cordless. To this end, it has a rechargeable battery 14 in the region of a housing 12. The battery 14 exhibits lithium. The hand-held power tool 10 is configured as a portable device. It preferably has a weight of between 0.5 and 15 kg and generally of less than 25 kg.

The hand-held power tool 10 also has a tool fitting 16. A tool 18 is held in the tool fitting 16. The tool 18 has a diamond drill bit.

In a schematic illustration, a drive unit 20 of the hand-held power tool 10 is also discernible in FIG. 1. The drive unit 20 is located inside the housing 12 and is illustrated in a manner superimposed on the housing 12 only for reasons of illustration.

The drive unit 20 drives a shaft to which, in turn, the tool fitting 16 is coupled.

The drive unit 20 has an electropneumatic impact mechanism and a rotary drive, which drive the shaft in a striking and rotating manner, respectively. The impact mechanism and the rotary drive are mechanically connected via a transmission of the drive unit 20 to an electric motor of the drive unit 20 and are able to be driven thereby.

FIG. 2 shows a detail of the drive unit 20 in a schematic cross-sectional view.

In particular, a sealing geometry 22 is apparent, which is designed to provide sealing between a shaft 24 driven by the drive unit 20 and the housing 12, which is not illustrated in detail in FIG. 2. In particular, the sealing geometry 22 seals off an interior IB, containing a lubricant 26, of the drive unit 20 from an exterior AB. In FIG. 2, the lubricant 26 is indicated schematically in the form of a plurality of wavy lines. In this case, the lubricant 26 can in principle reach the entire free and continuous space within the interior IB and spread out within this space.

Ideally, the lubricant 26 cannot leave the interior IB.

The lubricant 26 is an aqueous lubricant. It contains 33 percent by weight water. Thus, the hand-held power tool 10 (FIG. 1) has the drive unit 20, wherein the drive unit 20 has the aqueous lubricant 26.

As will be explained in more detail below, the sealing geometry 22 is designed to be used to seal off the aqueous lubricant 26 and as a result is particularly suitable therefor.

The sealing geometry 22 is configured to radially encircle the shaft 24. In particular, the sealing geometry 22 and the shaft 24 are configured symmetrically to the longitudinal axis of the shaft 24.

The sealing geometry 22 has a seal carrier 28. The seal carrier 28 can be made from NBR. The seal carrier 28 is fixed to the shaft 24 by way of a press fit. Alternatively or additionally, the seal carrier 28 can be vulcanized onto and/or adhesively bonded to the shaft 24.

On its side facing the rest of the interior IB, the seal carrier 28 has at least one vortex structure 29 for creating at least one vortex flow within the lubricant 26. In particular, the seal carrier 28 has two vortex structures 29. The vortex structures 29 are configured in a channel-like manner. Their cross section can be configured in an elliptical, in particular circular, or at least substantially elliptical manner. The housing 12 can have a vortex structure configured so as to be complementary to at least one of the vortex structures 29. By way of the vortex structures 29, during operation of the drive unit 20, one or more vortex flows can form in lubricant 26 flowing toward the sealing geometry 22. In particular, vortex flows in opposite directions can form in the region of the vortex structures 29, as are marked by circular-arc arrows in FIG. 2. As a result of these vortex flows or as a result of the vortex structures 29, the sealing action of the sealing geometry 22 can therefore be further improved.

Fitted in an indentation 30 in the seal carrier 28 is a sealing lip 32. The sealing lip 32 has a V-shaped cross section. Its sealing lip wing 34 projects from the seal carrier 28 obliquely, in particular laterally, i.e. in a direction parallel to the longitudinal axis of the shaft 24, and in a radial direction relative to the shaft 24.

The sealing lip 32 is made from an elastomer. In one exemplary embodiment of the invention, to this end, the sealing lip 32 is made from NBR. In an alternative exemplary embodiment, the sealing lip 32 is made from a fluorine-containing rubber, in particular from an FKM. The sealing lip 32, in particular the sealing lip wing 34, can have a plasma coating, in particular for reducing the friction of the sealing lip wing 34 against the housing 12.

When the drive unit 20 is at a standstill, the free end of the sealing lip wing 34 and thus the sealing lip 32 bears laterally against the housing 12. In this respect, the housing 12 forms a mating surface for the sealing lip 32. In particular, the sealing lip wing 34 presses against the housing 12 with a, preferably low, pressure force. Therefore, when the drive unit 20 is at a standstill, the sealing lip wing 34 seals off the interior IB, which is delimited from the exterior AB by the housing 12 and the seal carrier 28, inter alia, from the exterior AB. The lubricant 26 located in the interior IB cannot escape into the exterior AB.

During operation of the drive unit 20 and therefore during rotation of the shaft 24, the sealing lip wing 34 is deformed in a direction radially away from the shaft 24 on account of centrifugal force. As a result, the pressure force of the sealing lip wing 34, with which the latter is pressed against the housing 12, is reduced. If the speed of the shaft 24 exceeds a minimum rotational speed, the sealing lip wing 34 is lifted at least slightly off the housing 12.

The friction between the sealing lip wing 34 and the housing 12 and therefore the otherwise locally arising relative temperature increase are, as a result, diminished or avoided. A local formation of water vapor in the region of the sealing lip wing 34 can therefore likewise be reduced in scope or even avoided entirely.

The sealing action of the sealing geometry 22 is maintained even in the event of the sealing lip wing 34 lifting off on account of the resultant centrifugal forces, as a result of which lubricant 26 flowing up is forced out of the boundary region between the seal carrier 28 and the sealing lip 32 and the housing 12.

In order to additionally support this dynamic sealing effect, a lubricant labyrinth seal 36 having a constriction 38 in the form of a narrow channel is formed between the housing 12 and the seal carrier 28.

At least one thread can be formed in the region of the lubricant labyrinth seal 36, in particular in the region of the constriction 38. By way of the thread, lubricant 26 can additionally be conveyed away from the sealing lip 32 during operation of the drive unit 20. To this end, the thread can preferably be formed so as to extend in a radial direction or at least so as not to extend axially with respect to the shaft 24.

The invention claimed is:

1. A sealing geometry for a mobile power tool wherein the mobile power tool has a housing forming a mating surface, and a drive unit, wherein the sealing geometry is designed to seal off an interior (IB), containing a lubricant, of the drive unit from an exterior (AB) outside the drive unit,
the sealing geometry having a seal that is contactless at least during operation of the drive unit, wherein the sealing geometry has a sealing lip sealing against the mating surface arranged at the housing of the mobile power tool.

2. The sealing geometry as claimed in claim 1, wherein the sealing lip bears against the mating surface of the mobile power tool when the drive unit is at a standstill, in order to seal off the interior (IB) from the exterior (AB).

3. The sealing geometry as claimed in claim 2, wherein the sealing geometry has a seal carrier on and/or in which the sealing lip is arranged.

4. The sealing geometry of claim 3, wherein the sealing lip fits in an indentation in the seal carrier.

5. The sealing geometry as claimed in claim 2, wherein the sealing lip has a V-shaped or an at least substantially V-shaped cross section.

6. The sealing geometry as claimed in claim 1, wherein the sealing lip is configured such that, during operation of the drive unit, the sealing lip comes away from the mating surface of the mobile power tool or that, during operation of the drive unit, a pressure force of the sealing lip on the mating surface is reduced at least compared with when the drive unit is at a standstill.

7. The sealing geometry as claimed in claim 1, wherein the sealing geometry is designed to create at least one vortex flow in the lubricant) during operation of the drive unit, said vortex flow improving the sealing action of the sealing geometry.

8. The sealing geometry as claimed in claim 1, wherein the sealing geometry has a seal carrier having at least one vortex structure for creating the at least one vortex flow.

9. The sealing geometry as claimed in claim 1, wherein the sealing geometry is designed to have and/or to create a sealing fluid at least during operation of the drive unit.

10. The sealing geometry of claim 9, wherein the sealing geometry is designed to have and/or create a sealing air at least during operation of the drive unit.

11. The sealing geometry as claimed in claim 1, wherein the sealing geometry has a lubricant labyrinth seal.

12. The sealing geometry as claimed in claim 1, wherein the sealing geometry comprises an acrylonitrile butadiene.

13. The sealing geometry as claimed in claim 1, wherein the sealing geometry comprises a fluorine-containing material.

14. The sealing geometry as claimed in claim 1, wherein the sealing geometry comprises a water-vapor-resistant material.

15. The sealing geometry as claimed in claim 1, wherein the sealing geometry comprises a high-temperature-resistant material.

16. The sealing geometry as claimed in claim 1, wherein the sealing geometry, has a coating.

17. A mobile power tool wherein the mobile power tool has a housing and a drive unit and a sealing geometry, wherein the sealing geometry is designed to seal off an interior (IB), containing a lubricant, of the drive unit from an exterior (AB) outside the drive unit, wherein the mobile power tool has the sealing geometry according to claim 1.

18. The mobile power tool as claimed in claim 17, wherein the lubricant is aqueous.

19. The mobile power tool as claimed in claim 18, wherein the lubricant comprises, in addition to water, at least one additive.

20. The mobile power tool as claimed in claim 17, wherein the lubricant comprises at least 5 percent water.

\* \* \* \* \*